United States Patent
Miyoshi et al.

(10) Patent No.: US 6,724,430 B2
(45) Date of Patent: Apr. 20, 2004

(54) SAMPLING FREQUENCY CONVERTER, SAMPLING FREQUENCY CONVERSION METHOD, VIDEO SIGNAL PROCESSOR, AND VIDEO SIGNAL PROCESSING METHOD

(75) Inventors: Toshihiro Miyoshi, Osaka (JP); Hisaji Murata, Osaka (JP); Manabu Yumine, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 460 days.

(21) Appl. No.: 09/820,312

(22) Filed: Mar. 29, 2001

(65) Prior Publication Data

US 2002/0056138 A1 May 9, 2002

(30) Foreign Application Priority Data

Mar. 29, 2000 (JP) .......................................... 2000-090345

(51) Int. Cl.⁷ .............................. H04N 7/01; G10L 3/02
(52) U.S. Cl. ....................... 348/441; 348/450; 348/571; 348/572; 348/663; 704/503
(58) Field of Search ................................ 348/441, 450, 348/571, 572, 575, 576, 663, 497; 704/503, 211

(56) References Cited

U.S. PATENT DOCUMENTS

| 5,043,799 A | | 8/1991 | Kohiyama et al. | |
| 5,327,125 A | * | 7/1994 | Iwase et al. | 341/61 |
| 5,335,074 A | * | 8/1994 | Stec | 348/537 |
| 5,446,398 A | * | 8/1995 | Iwata | 327/113 |
| 5,532,749 A | * | 7/1996 | Hong | 348/449 |
| 5,583,575 A | * | 12/1996 | Arita et al. | 348/451 |
| 5,600,379 A | * | 2/1997 | Wagner | 348/497 |
| 5,812,210 A | * | 9/1998 | Arai et al. | 348/555 |
| 5,920,842 A | * | 7/1999 | Cooper et al. | |
| 6,052,156 A | * | 4/2000 | Mukai et al. | 348/642 |
| 6,323,907 B1 | * | 11/2001 | Hwang | 348/457 |

FOREIGN PATENT DOCUMENTS

| JP | 11-68516 | 3/1999 |
| JP | 2000-333127 | 11/2000 |

\* cited by examiner

*Primary Examiner*—Michael H. Lee
*Assistant Examiner*—Paulos Natnael
(74) *Attorney, Agent, or Firm*—Wenderoth, Lind & Ponack, L.L.P.

(57) ABSTRACT

A DD converter circuit 109 for interpolating a digital video signal which is locked to a 14.3-MHz burst clock to convert the sampling data so as to be locked to a 13.5-NHz free-run clock, and a frame memory circuit 110 for writing a digital video signal which is output by the DD converter circuit 109 on the 14.3-MHz burst clock as well as reading the written digital video signal on a 13.5-MHz clock S112 are included. Therefore, a video signal processor which can realize the rate conversion of the digital video signal without using an analog PLL circuit can be provided.

4 Claims, 11 Drawing Sheets

Fig.3 (a) data waveform chart
Fig.3 (b) data waveform chart
Fig.3 (c) Y signal S108a
Fig.3 (d) addition output
Fig.3 (e) enable signal S109b
Fig.3 (f) DD converted Y signal S109a

※1=14.3M
※2=13.5M

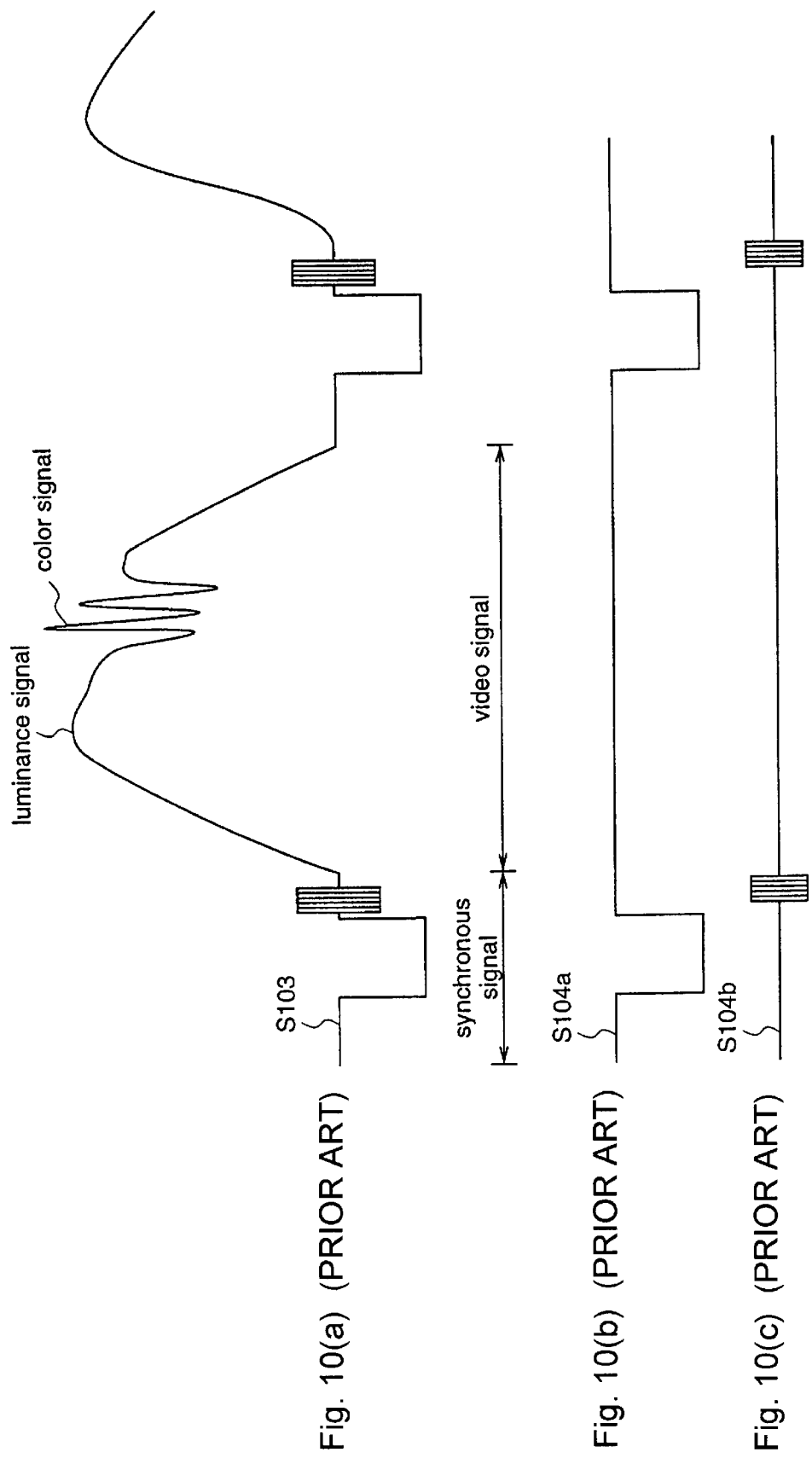

S103

S106a

S106b

US 6,724,430 B2

SAMPLING FREQUENCY CONVERTER, SAMPLING FREQUENCY CONVERSION METHOD, VIDEO SIGNAL PROCESSOR, AND VIDEO SIGNAL PROCESSING METHOD

FIELD OF THE INVENTION

The present invention relate to a video signal processor for separating a television signal into Y (Luminance) and C (Color) signals and outputting the Y and C signals as digital video signals and, more particularly, to rate conversion of the digital video signals and generation of a clock which is used for the rate conversion.

BACKGROUND OF THE INVENTION

Hereinafter, a prior art video signal processor for separating an analog television signal into Y (Luminance) and C (Color) signals, and converting the signals into digital video signals to be output is described with reference to drawings.

FIG. 9 is a block diagram illustrating the prior art video signal processor.

FIG. 10 are waveform charts of a video signal, FIG. 10(a) showing a video signal, FIG. 10(b) showing a synchronous signal, and FIG. 10(c) showing a burst signal.

FIG. 11 are diagrams for explaining the Y/C separation, FIG. 11(a) showing a video signal, FIG. 11(b) showing a Y (luminance) signal, and FIG. 11(c) showing a C (color) signal.

As shown in FIG. 9, the prior art video signal processor comprises an analog television signal input terminal 101, a first digital video signal output terminal 102, a first A/D converter circuit 103, a synchronization separator/burst detector circuit 104, a burst locked clock generator circuit 105, a Y/C separator circuit 106, a color decoder circuit 107, a TBC circuit 108, a divider circuit 112, a vertical/horizontal signal generator circuit 113, a multiplexer circuit 114, a D/A converter circuit 115, a second A/D converter circuit 116, a synchronization separator circuit 117, a horizontal synchronous clock generator circuit 118, a second digital video signal output terminal 201, a DVC preprocessing circuit 202, and a frame synchronization clock generator circuit 205.

Hereinafter, the operation of the so-constructed video signal processor is described.

The analog television signal input terminal 101 is an input terminal to which an analog television signal S101 is input. As the analog television signals, there are standard television signals which are determined by the standards like broadcasting, television signals whose synchronous signals have deviated frequencies or which include jitter, such as television signals which are reproduced for example by a video tape recorder, and non-standard television signals which are not standard television signals.

The first digital video signal output terminal 102 outputs a first digital video signal S102 which is obtained by multiplexing a Y (luminance) signal, a Cr (color difference-red) signal, Cb (color difference-blue) signal and a synchronous signal, to an apparatus or an equipment which is connected to this video signal processor, at a 27-MHz bit rate which is a transmission format of ITU-R recommendation BT.656 according to the digital interface standards.

The first A/D converter circuit 103 samples the analog television signal S101 on a 14.3-MHz burst locked clock S105 (which is described later), to be converted into a digital television signal S103. The first A/D converter circuit 103 also can sample the analog television signal S101 for example on a 28.6-MHz burst locked clock.

The synchronization separator/burst detector circuit 104 separates a synchronous signal S104a as shown in FIG. 10(b) from the digital television signal S103 as shown in FIG. 10(a) by a threshold. Further, the circuit 104 extracts a 3.58-MHz burst signal S104b as shown in FIG. 10(c), which is multiplexed as a reference signal for color reproduction, from the separated synchronous signal.

The burst locked clock generator circuit 105 multiplies the 3.58-MHz burst signal S104b by four to generate a 14.3-MHz burst locked clock S105.

The Y/C separator circuit 106 converts the digital television signal S103 in which a Y (luminance) signal and a C (color) signal are frequency-multiplexed as shown in FIG. 11(a), into a Y signal S106a as shown in FIG. 11(b) and a C signal S106b as shown in FIG. 11(c). When the input analog television signal is a standard television signal, still-picture parts are subjected to a three-dimensional processing using a frame memory, and moving-picture parts are subjected to a two-dimensional processing using a line filter, with utilizing the fact that the color phase is inverted frame/line by frame/line.

The color decoder circuit 107 demodulates the digital C signal S106 into a digital Cr signal S107a and a digital Cb signal S107b, because the phases of the Cr signal and the Cb signal are shifted by 90 degrees from each other.

The TBC (Time Base Corrector) circuit 108 detects the time of the horizontal synchronous signal of the synchronous signal S104a, and converts the Y signal S106a, the Cr signal S107a and the Cb signal S107b according to the length of the horizontal synchronous signal of the synchronous signal S104a, to be output as a Y signal S108a, a Cr signal S108b, and a Cb signal S108c.

The D/A converter circuit 115 converts the Y signal S108a, the Cr signal S108b and the Cb signal S108c which are the digital signals output from the TBC circuit 108, into analog signals, i.e., a Y signal S115a, a Cr signal S115b, and a Cb signal S115c.

The second A/D converter circuit 116 samples the Y signal S115a, the Cr signal S115b and the Cb signal S115c on a 13.5-MHz clock S112 (which is described later), to be converted into digital signals, i.e., a Y signal S116a, a Cr signal S116b and a Cb signal S116c. Here, it is also possible that the Cr signal and the Cb signal are multiplexed before being input to the second D/A converter circuit 115, and the D/A converter circuit 115 and the second D/A converter circuit 116 perform the conversion of the Y signal and the C signal. Further, the second A/D converter circuit also can perform the sampling for example on a 27-MHz clock.

The synchronization separator circuit 117 separates a horizontal synchronous signal S117a and a vertical synchronous signal S117b from the Y signal S116a, and outputs the signals.

The horizontal synchronous clock generator circuit 118 outputs a 27-MHz horizontal synchronous clock S118 which is synchronized with the horizontal synchronous signal S117a, to the divider circuit 112 and the multiplexer circuit 114. The horizontal synchronous clock generator circuit 118 is commonly constituted by an analog PLL circuit.

The divider circuit 112 divides the frequency of the 27-MHz horizontal synchronous clock S118 into 13.5 MHz. This 13.5-MHz clock S112 is the above-mentioned sampling clock which is input into the second A/D converter circuit 116.

The vertical/horizontal signal generator circuit 113 generates a synchronous signal S113 corresponding to a BT.656 transmission format, from the horizontal synchronous signal S117a and the vertical synchronous signal S117b, and output the signal S113.

The multiplexer circuit 114 multiplexes the Y signal S116a, the Cr signal S116b, the Cb signal S116c and the synchronous signal S113 on the 27-MHz horizontal synchronous clock S118, and outputs a multiplexed signal as the first digital video signal S102. The first digital video signal S102 is output from the first digital video signal output terminal 102 to an apparatus or an equipment which is connected to this video signal processor.

The second digital video signal output terminal 201 is an output terminal for outputting a second digital video signal S201 in which the Y signal, the Cr signal and the Cb signal are multiplexed, at 18 MHz. The second digital video signal S201 is input to a DCT (Discrete Cosine Transform) block for performing intra-frame compression/decompression, processed at 18 MHz, and thereafter recorded/reproduced by a block for performing recording/reproduction into/from a tape.

The DVC preprocessing circuit 202 multiplexes the 13.5-MHz Y signal S116a, Cr signal S116a and Cb signal S116c which are output from the second A/D converter circuit 116, on the basis of a 18-MHz clock S205 which is synchronized with one frame (described later), to be output as the second digital video signal S201. At this time, the DVC preprocessing circuit 202 decompresses the Y signal S116a into a 18-MHz Y signal, thins down the Cr signal S116b and the Cb signal S116c into 9 MHz, and thereafter multiplexes these signals.

The frame synchronization clock generator circuit 205 generates and outputs the 18-MHz clock S205 which is synchronized with one frame, corresponding to twice of the vertical synchronous signal S117b which is output from the synchronization separator circuit 117. Here, the frame synchronous clock generator circuit 205 is commonly constituted by an analog PLL circuit.

Problems To Be Solved by the Invention

However, in the prior art video signal processor, in order to convert the rates of the 14.3-MHz digital Y signal, digital Cr signal and digital Cb signal to obtain the 13.5-MHz digital Y signal, digital Cr signal and digital Cb signal, it is required to provide an external analog PLL circuit, like the horizontal synchronous clock generator circuit 118 for generating the 27-MHz horizontal synchronous clock S118. Further, also when the 13.5-MHz digital Y signal, digital Cr signal and digital Cb signal are subjected to the rate conversion to obtain the 18-MHz digital Y signal, digital Cr signal and digital Cb signal, and then these signals are multiplexed, an analog PLL circuit like the frame synchronization clock generator circuit 205 for generating the 18-MHz clock S205 is required.

As described above, in the prior art video signal processor, it is required to provide an external analog PLL circuit to perform the rate conversion of the digital video signals, whereby the circuit (component) scale is increased and the integration of the LSI becomes difficult.

Therefore, the present invention has an object to provide a video signal processor and a video signal processing method, which reduces the circuit scale as well as facilitates the integration of the LSI.

Measures To Solve the Problems

A sampling frequency converter according to one aspect of the present invention comprises: a digital-digital conversion means for receiving a first digital video signal which has been sampled on a first clock signal having a first frequency, interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output on the basis of the first clock signal; a clock generation means for generating a second clock signal having a second frequency which is one-Nth as high as that of the first clock signal; and a storage means for retaining the second digital video signal as well as reading the retained second digital video signal on the second clock signal to be output as a third digital video signal.

According to the sampling frequency converter of the above-discussed aspect of the present invention, the rate conversion of the digital video signal is enabled without providing an analog PLL circuit for generating a clock which is synchronized with a horizontal synchronous signal.

A video signal processor according to another aspect of the present invention comprises: an A/D converter circuit for sampling an analog video signal on a first clock signal having a first frequency, to be converted into a first digital video signal; a synchronous signal separation means for separating a first synchronous signal from the analog video signal; a first clock generation means for generating the first clock signal from the first synchronous signal; and a sampling frequency converter for interpolating the first digital video signal to be converted into a second digital video signal, and outputting the second digital video signal on the basis of a second clock signal having a second frequency. The sampling frequency converter comprises: a first digital-digital conversionmeans for interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output on the basis of the first clock signal; a second clock generation means for generating a second clock signal having a second frequency which is one-Nth as high as that of the first clock signal; and a storage means for retaining the second digital video signal as well as reading the retained second digital video signal on the second clock signal to be output as a third digital video signal.

According to the video signal processor of the above-discussed aspect of the present invention, the rate conversion of the digital video signal is enabled without providing outside an analog PLL circuit for generating a clock which is synchronized with a horizontal synchronous signal, whereby the circuit scale is reduced and the integration of the LSI is easily performed.

According to a video signal processor of another aspect of the present invention, a video signal processor discussed above further comprises: a multiplication means for multiplying the second clock signal to generate a third clock signal having a third frequency; a division means for dividing the third clock signal to generate a fourth clock signal having a fourth frequency; and a second digital-digital conversion means for converting the third digital video signal into a fourth digital video signal on the basis of the fourth clock signal.

According to the video signal processor of the above-discussed aspect of the present invention, the rate conversion of the digital video signal is enabled without providing outside an analog PLL circuit for generating a clock which is synchronized with one frame, whereby the circuit scale is reduced and the integration of the LSI is easily performed.

According to the video signal processor of another aspect of the present invention, the video signal processor of an above-discussed aspect further comprises a synchronization comparison means for comparing a phase of the first synchronous signal with a phase of a second synchronous signal which is generated from the second clock signal. The storage means comprises: a first frame storage means for retaining the second digital video signal in frame units as well as reading the retained second digital video signal in frame units on the basis of the second clock signal to be output as a fourth digital video signal; a second frame storage means for retaining the second digital video signal in frame units as well as reading the retained second digital video signal in frame units on the basis of the second clock signal to be output as a fifth digital video signal; and a switching means for receiving the fourth digital video signal and the fifth digital video signal, and alternately switching between the fourth digital video signal and the fifth digital video signal to be output as the third digital video signal. The synchronous comparison means outputs a switch signal which instructs the switching means to output either the fourth digital video signal or fifth digital video signal as the third digital video signal repeatedly twice when it detects that the phase of the first synchronous signal has gotten ahead of the phase of the second synchronous signal, and outputs a switch signal which instructs the switching means to eliminate one frame of either the fourth digital video signal or fifth digital video signal when it detects that the phase of the second synchronous signal has gotten ahead of the phase of the first synchronous signal, to the switching means, and the switching means outputs one of the fourth digital video signal and the fifth digital video signal as the third digital video signal, in accordance with the switch signal.

According to the video signal processor of the above-discussed aspect of the present invention, the occurrence of noises on a screen can be avoided even when non-standard television signals are input.

A sampling frequency conversion method according to another aspect of the present invention comprises: a digital-digital conversion step of receiving a first digital video signal which has been sampled on a first clock signal having a first frequency, interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output on the basis of the first clock signal; a clock generation step of generating a second clock signal having a second frequency which is one-Nth as high as that of the first clock signal; and a storage step of retaining the second digital video signal as well as reading the retained second digital video signal on the second clock signal to be output as a third digital video signal.

According to the sampling frequency conversion method of the above-discussed aspect of the present invention, the sampling frequency converter which enables the rate conversion of the digital video signal can be constituted, without providing an analog PLL circuit for generating a clock which is synchronized with a horizontal synchronous signal.

A video signal processing method according to another aspect of the present invention comprises: an A/D conversion step of sampling an analog video signal on a first clock signal having a first frequency to be converted into a first digital video signal; a synchronous signal separation step of separating a first synchronous signal from the analog video signal; a first clock generation step of generating the first clock signal from the first synchronous signal; a first digital-digital conversion step of interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output on the basis of the first clock signal; a second clock generation step of generating a second clock signal having a second frequency which is one-Nth as high as that of the first clock signal; and a storage step of retaining the second digital video signal as well as reading the retained second digital video signal on the second clock signal to be output as a third digital video signal.

According to the video signal processing method of the above-discussed aspect of the present invention, the video signal processor which can perform the rate conversion of the digital video signal without providing outside an analog PLL circuit for generating a clock which is synchronized with a horizontal synchronous signal, has a reduced circuit scale, and easily performs the integration of the LSI can be constituted.

According to the video signal processing method of another aspect of the present invention, the video signal processing method of the above-discussed aspect further comprises: a multiplication step of multiplying the second clock signal to generate a third clock signal having a third frequency; a division step of dividing the third clock signal to generate a fourth clock signal having a fourth frequency; and a second digital-digital conversion step of converting the third digital video signal into a fourth digital video signal on the basis of the fourth clock signal.

According to the video signal processing method of the above-discussed aspect of the present invention, the rate conversion of the digital video signal is enabled without providing outside an analog PLL circuit for generating a clock which is synchronized with one frame, whereby the circuit scale is reduced and the integration of the LSI is easily performed.

According to the video signal processing method of another aspect of the present invention, the video signal processing method of an above-discussed aspect further comprises a synchronization comparison step of comparing a phase of the first synchronous signal with a phase of a second synchronous signal which is generated from the second clock signal. The storage step comprises: a first frame storage step of retaining the second digital video signal in frame units as well as reading the retained second digital video signal on the basis of the second clock signal in frame units to be output as a fourth digital video signal; a second frame storage step of retaining the second digital video signal in frame units as well as reading the retained second digital video signal on the basis of the second clock signal in frame units to be output as a fifth digital video signal; and a switching step of receiving the fourth digital video signal and the fifth digital video signal, and alternately switching between the fourth digital video signal and the fifth digital video signal to be output as the third digital video signal. The synchronization comparison step outputs a switch signal which instructs to output either the fourth digital video signal or the fifth digital video signal as the third digital video signal repeatedly twice when it is detected that the phase of the first synchronous signal has gotten ahead of the phase of the second synchronous signal, and outputs a switch signal which instructs to eliminate one frame of either the fourth digital video signal or fifth digital video signal when it is detected that the phase of the second synchronous signal has gotten ahead of the phase of the first synchronous signal. The switching step outputs one of the fourth digital video signal and the fifth digital video signal as the third digital video signal, in accordance with the switch signal.

According to the video signal processing method of the above-discussed aspect of the present invention, the occurrence of noises on a screen can be prevented even when non-standard television signal are input.

BRIEF DESCRIPTION OF THE DRAWINGS

FIGS. 4(a)–4(c) are diagrams showing the number of samples in an effective pixel period during one horizontal period of a video signal and the number of effective pixels in a blanking period, FIG. 4(a) showing a Y signal 108a, FIG. 4(b) showing a DD converted Y signal 109a, and FIG. 4(c) showing a Y signal 110a.

FIGS. 10(a)–10(c) are waveform charts of a video signal, FIG. 10(a) showing a video signal, FIG. 10(b) showing a synchronous signal, and FIG. 10(c) showing a burst signal.

DETAILED DESCRIPTION OF THE PREFERRED EMBODIMENTS

Hereinafter, embodiments of the present invention will be described with reference to the figures.

[Embodiment 1]

Figure 1:
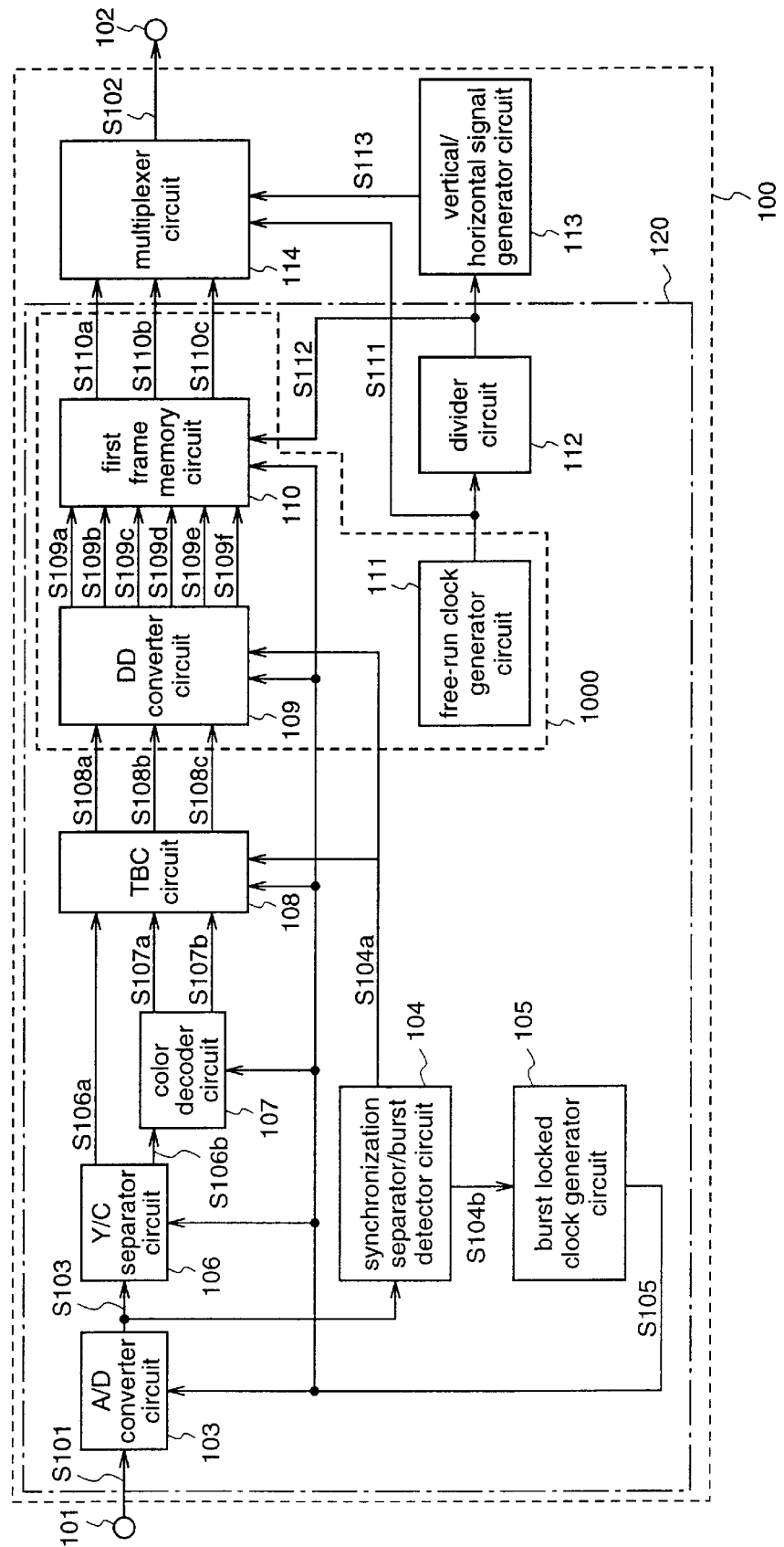
FIG. 1 is a block diagram illustrating a video signal processor according to a first embodiment of the present invention.

FIG. 1 is a block diagram illustrating a structure of a video signal processor 100 according to the first embodiment of the present invention.

Figure 2:
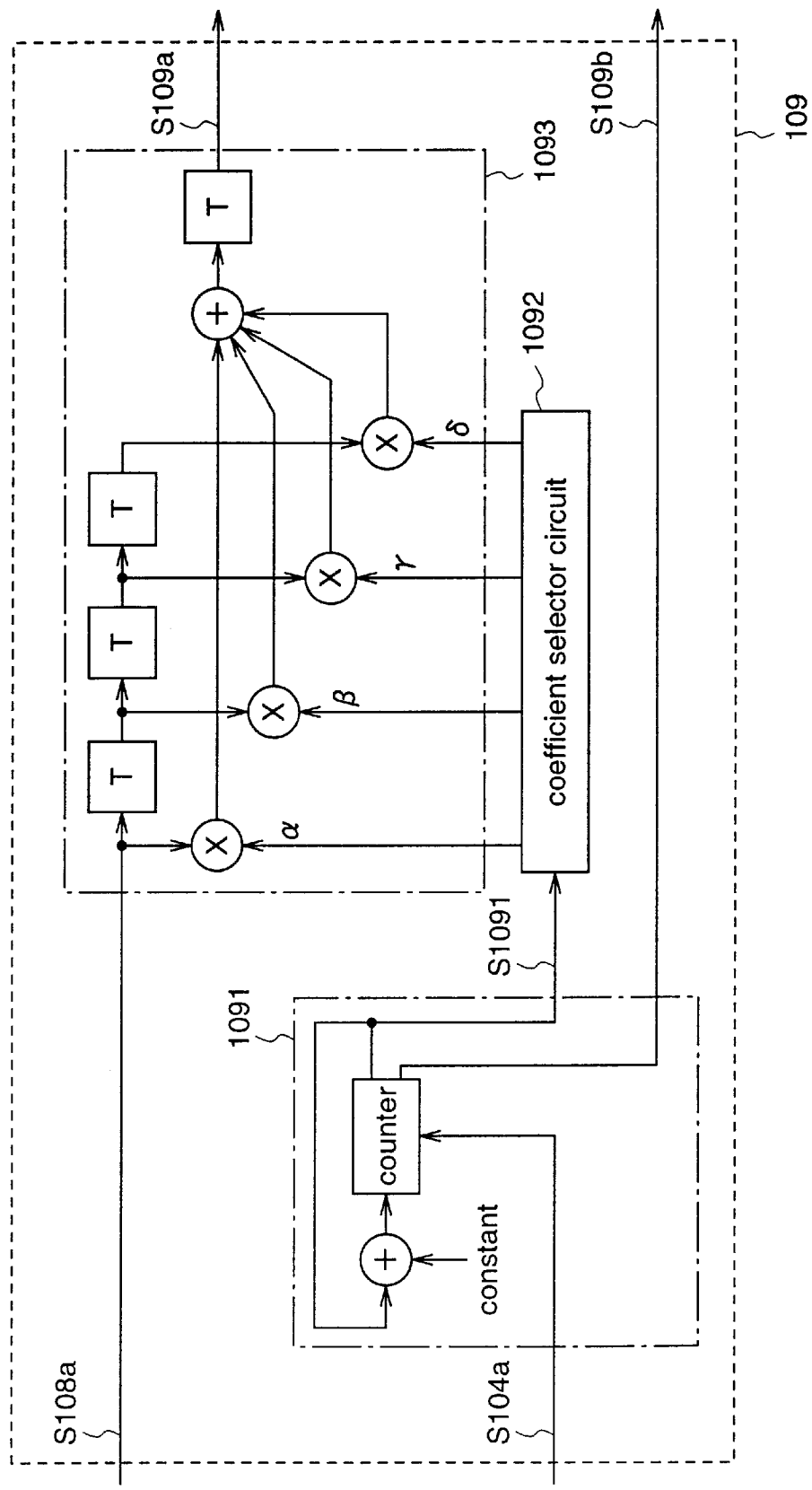
FIG. 2 is a block diagram illustrating a DD converter circuit 109.
Figure 3:
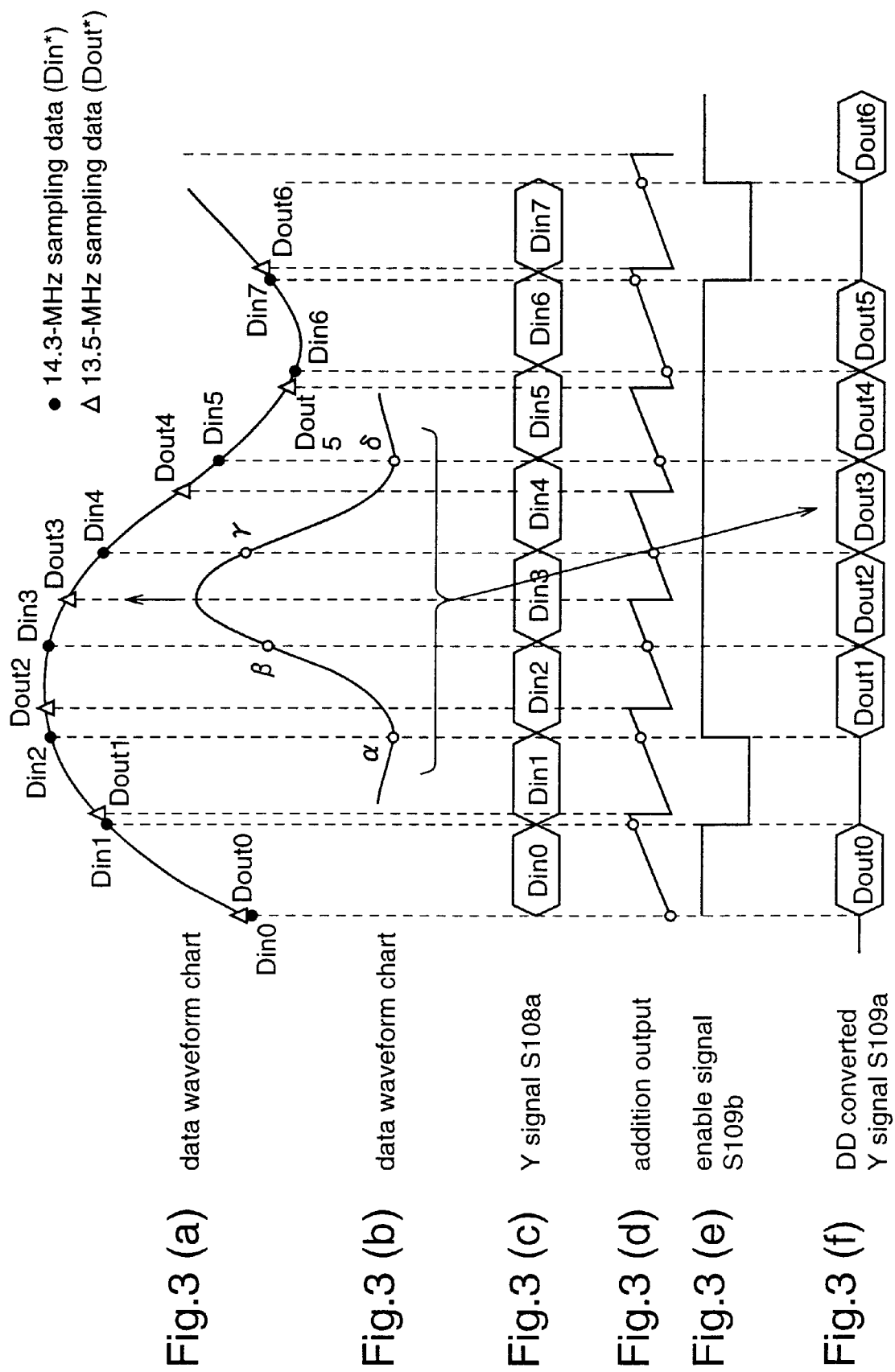
FIGS. 3(a)–3(f) are diagrams for explaining the operation of the DD converter circuit 109.

FIG. 2 is a block diagram illustrating a DD converter circuit. FIG. 3 is a diagram for explaining the operation of the DD converter circuit.

As shown in FIG. 1, the video signal processor 100 includes an analog television signal input terminal 101, a first digital video signal output terminal 102, an A/D converter circuit 103, a synchronization separator/burst detector circuit 104, a burst locked clock generator circuit 105, a Y/C separator circuit 106, a color decoder circuit 107, a TBC circuit 108, a DD (Digital-Digital) converter circuit 109, a first frame memory circuit 110, a free-run clock generator circuit 111, a divider circuit 112, a vertical/horizontal signal generator circuit 113, and a multiplexer circuit 114.

Figure 9:
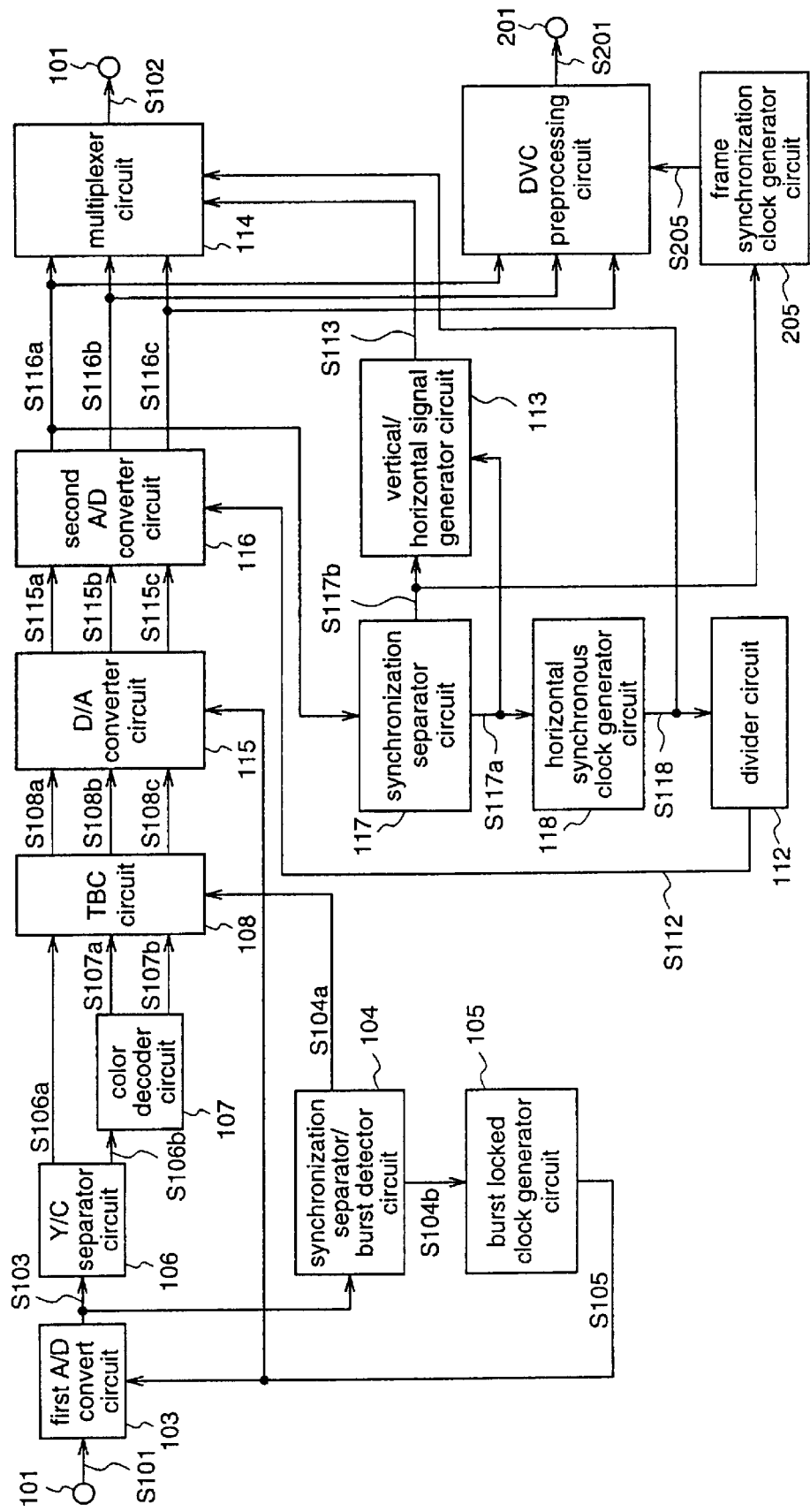
FIG. 9 is a block diagram illustrating a prior art video signal processor.
Figure 11A:
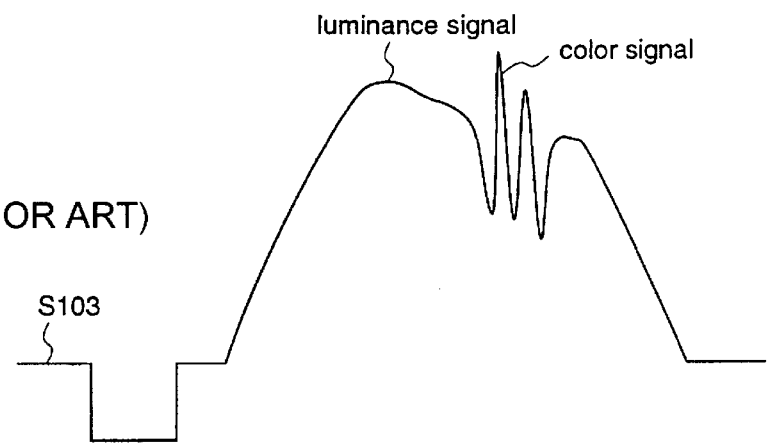
FIGS. 11(a)–11(c) are diagram for explaining the Y/C separation, FIG. 11(a) showing a video signal, FIG. 11(b) showing a luminance signal, and FIG. 11(c) showing a color signal.
Figure 11B:
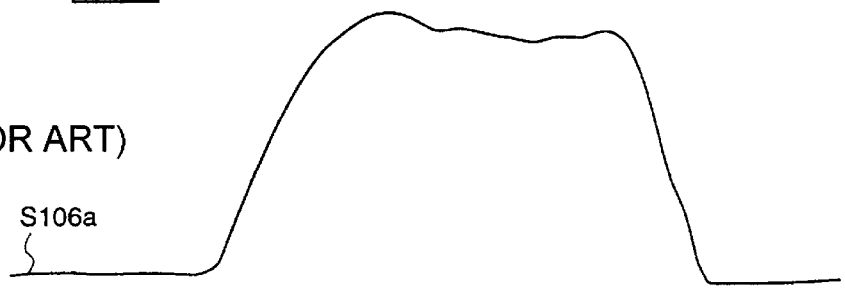
Figure 11C:
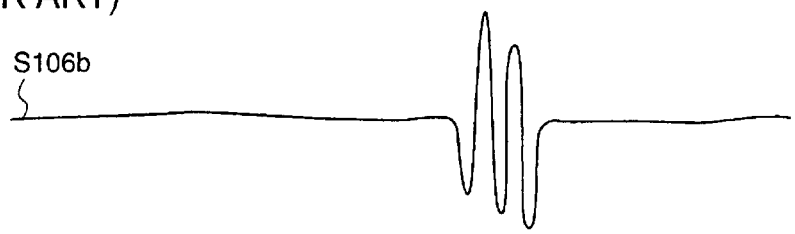

Here, in the video signal processor 100 shown in FIG. 1, the same reference numerals as those in FIG. 9 denotes the same elements of the prior art video signal processor.

The video signal processor according to the first embodiment newly includes a sampling frequency converter circuit 1000 comprising the DD converter circuit 109, the first frame memory circuit 110 and the free-run clock generator circuit 111, in place of the D/A converter circuit 115, the second A/D converter circuit 116 and the horizontal synchronous clock generator circuit 118 of the prior art video signal processor.

The DD converter circuit 109 interpolates the Y signal S108a, the Cr signal S108b and the Cb signal S108c, and outputs a DD converted Y signal S109a, a DD converted Cr signal S109c and a DD converted Cb signal S109e. Simultaneously, the DD converter circuit 109 also outputs a DD converted Y signal enable signal S109b, a DD converted Cr signal enable signal S109d and a DD converted Cb signal enable signal S109f. At this time, the DD converter circuit 109 converts the sampling data of the Y signal S108a, Cr signal S108b and Cb signal S108c which are locked to the 14.3-MHz burst locked clock S105, into sampling data which are locked to the 13.5-MHz free-run clock S112. To be more specific, since the effective pixel period during one horizontal period of the 14.3-MHz video signal has 764 samples while the effective pixel period during one horizontal period of the 13.5-MHz video signal has 720 samples, the DD converter circuit 109 converts the effective pixel periods during one horizontal periods of the Y signal S108a, the Cr signal S108b and the Cb signal S108c from 764 samples to 720 samples.

As shown in FIG. 2, the DD converter circuit 109 has an interpolation position detector circuit 1091, a coefficient selector circuit 1092 and a DD interpolation filter 1093. The synchronous signal S104a is input to the interpolation position detector circuit 1091, and the Y signal S108a is input to the DD interpolation filter 1093.

The operation of the so-constructed DD converter circuit 109 is described with reference to FIG. 3.

In FIG. 3, FIGS. 3(a) and 3(b) are data waveform charts, FIG. 3(c) shows the Y signal S108a, FIG. 3(d) shows an addition output, FIG. 3(e) shows the DD converted Y signal enable signal S109b, and FIG. 3(f) shows the DD converted Y signal S109a.

The sampling data of the 14.3-MHz Y signal S108a which is input to the DD converter circuit 109 are shown by ● (Din*) in FIG. 3(a), and the sampling data in a case where the Y signal S108a is converted into 13.5 MHz are shown by Δ (Dout*). Since the number of samples in one horizontal period in a case where the Y signal S108a is 13.5 MHz is 910 and the number of samples in one horizontal period in a case where the Y signal S108a is 14.3 MHz is 858, the interpolation position detector circuit 1091 has a counter which can count to 910, sets a constant at 858, counts the constant 858 and a value of one clock before using the 14.3-MHz clock, and outputs the addition result of these values as an addition output S1091 as shown by ○ in FIG. 3(d). Here, the value of one clock before refers to an addition output S1091 which was output from the counter one clock before. When the addition result overflows 910, the counter outputs the DD converted Y signal enable signal S109b as shown in FIG. 3(e). Here, assuming that a data Din0 is 0, the addition outputs S1091 of the interpolation position detector circuit 1091, corresponding to Din0, Din1, Din2, Din3, Din4, Din5, . . . , Din909 and Din910 are 0, 858, 806, 754, 702, 650, . . . , 52 and 0. Similarly, the DD converted Y signal enable signal S109b are 1, 0, 1, 1, 1, 1, . . . , 1 and 1. Further, the counter is reset by the synchronous signal S104a.

For example in a case where 910 is divided into 64, the coefficient selector circuit 1092 calculates which one among 0~63 the output S1091 of the interpolation position detector circuit 1091 corresponds to, then selects the corresponding coefficient $\alpha$, $\beta$, $\gamma$ or $\delta$ of the interpolation filter, and outputs the selected one. Here, the interval between the sampling data of the 14.3-MHz Y signal S108a is 69.84 nsec, and for example when this is divided into 64, the result is 1.09 nsec. Generally, in the case of television signal, an error of the order of 1 nsec is the detection limit. The interpolation filter 1093 performs a product-sum operation for the Y signal S108a using the coefficient $\alpha$, $\beta$, $\gamma$ or $\delta$ of the interpolation filter, and outputs the DD converted Y signal S109a. For example, Dout3 of the DD converted Y signal S109a is calculated as the data waveform chart shown in FIG. 3(b) as follows:

$$\alpha*Din2+\beta*Din3+\gamma*Din4+\delta*Din5.$$

Similarly, the DD converter circuit 109 generates the DD converted Cr signal S109c and the DD converted Cr signal enable signal S109d from the input Cr signal S108b, and the DD converted Cb signal S109e and the DD converted Cb signal enable signal S109f from the input Cb signal S108c.

The frame memory circuit 110 writes the DD converted Y signal S109a, the DD converted Cr signal S109c and the DD converted Cr signal S109e on the 14.3-MHz burst locked clock S105 when the DD converted Y signal enable signal S109b, the DD converted Cr signal enable signal S109d and the DD converted Cb signal enable signal S109f are enabled (Hi), respectively, and reads the respective written signals on the 13.5-MHz free-run clock S112 which is the output of the divider circuit 112 (described later), to be output as a Y signal S110a, a Cr signal S110b and a Cb signal S110c.

Hereinafter, how the Y signal 108a is converted into the DD converted Y signal S109a, and the DD converted Y signal S109a is converted into the Y signal S110a is described with reference to FIGS. 4(a)–4(c).

Figure 4:
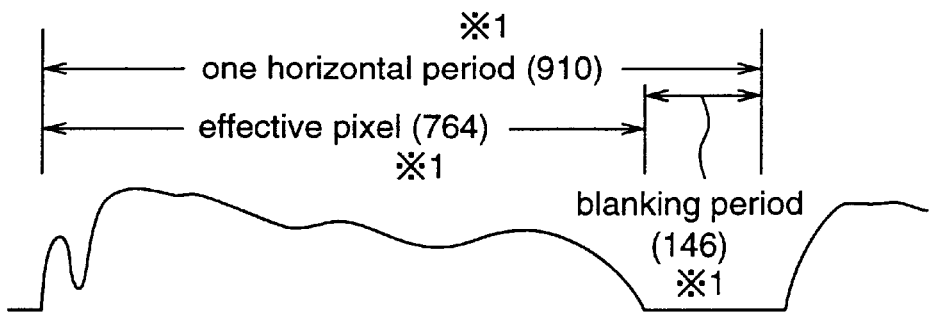
Figure 4:
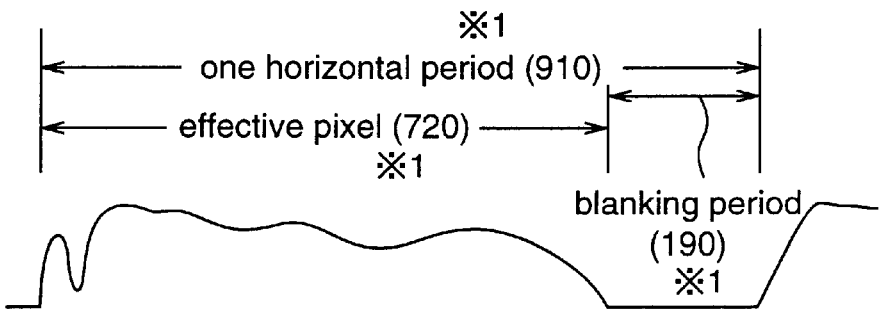
Figure 4:
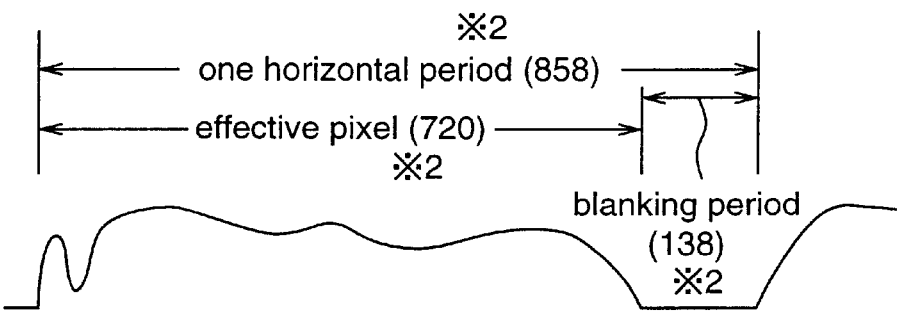

The 910 samples are obtained by sampling the Y signal S108a which is input to the DD converter circuit 109 on the 14.3-MHz burst locked clock, as shown in FIG. 4(a). There are 764 samples in the effective pixel period of one horizontal period, and there are 146 samples in the blanking period. The Y signal S108a is converted by the DD converter circuit 109 so that the effective pixel period in one horizontal period has 720 samples and the blanking period has 190 samples, as shown in FIG. 4(b), and output as the DD converted Y signal S109a. At this time, the number of samples in one horizontal period is not converted.

Further, the DD converted Y signal S109a is written in the frame memory circuit 110 on the 14.3-MHz burst locked clock, and thereafter read out on the 13.5-MHz free-run clock, resulting in the Y signal S110a whose one horizontal period has 858 samples, effective pixel period has 720 samples, and blanking period has 138 samples, as shown in FIG. 4(c).

Similarly, the Cr signal S108b and the Cb signal S108c are converted into the DD converted Cr signal 109b and the DD converted Cb signal 109c, and the DD converted Cr signal 109b and the DD converted Cb signal 109c are converted into the Cr signal S110b and the Cb signal S110c, respectively.

As described above, the 14.3-MHz digital Y signal, digital Cr signal, and digital Cb signal are converted by the DD converter circuit 109 and the frame memory circuit 110 into the 13.5-MHz digital Y signal, digital Cr signal and digital Cb signal.

It is also possible to use the same clock as the writing and reading clocks of the frame memory circuit, provide a small-capacity memory in the latter stage, and set a writing clock for the small-capacity memory at 14.3 MHz and the reading clock at 13.5 MHz, to convert the rates of the digital Y signal, the digital Cr signal and the digital Cb signal.

The free-run clock generator circuit 111 generates a 27-MHz free-run clock S111, for example by a crystal oscillator. Here, it is required to ensure the precision of the crystal to generate a stable free-run clock.

The divider circuit 112 divides the 27-MHz free-run clock S111 into two, to generate a 13.5-MHz free-run clock S112.

The vertical/horizontal synchronous signal generator circuit 113 has a horizontal counter (858 counter) and a frame counter (525 counter), generates a horizontal synchronous signal S113a by the 858 counter on the basis of the 13.5-MHz free-run clock S112, and generates a vertical synchronous signal S113b by the 525 counter on the basis of the horizontal synchronous signal.

The multiplexer circuit 114 multiplexes the Y signal S110a, the Cr signal S110b and the Cb signal S110c which are out put by the frame memory circuit 110, and the horizontal synchronous signal S113a and the vertical synchronous signal S113b, on the 27-MHz free-run clock S111, to be output as a first digital video signal S102 to the first digital video signal output terminal 102.

As described above, according to the video signal processor according to the first embodiment, the sampling frequency converter circuit 1000 comprising the DD converter circuit 109, the first frame memory 110 and the free-run clock generator clock 111 is provided, whereby the 14.3-MHz digital Y signal, digital Cr signal and digital Cb signal can be converted into the 13.5-MHz digital Y signal, digital Cr signal and digital Cb signal, without providing outside an analog PLL circuit for generating the horizontal synchronous clock which is synchronized with the horizontal synchronous signal.

[Embodiment 2]

Figure 5:
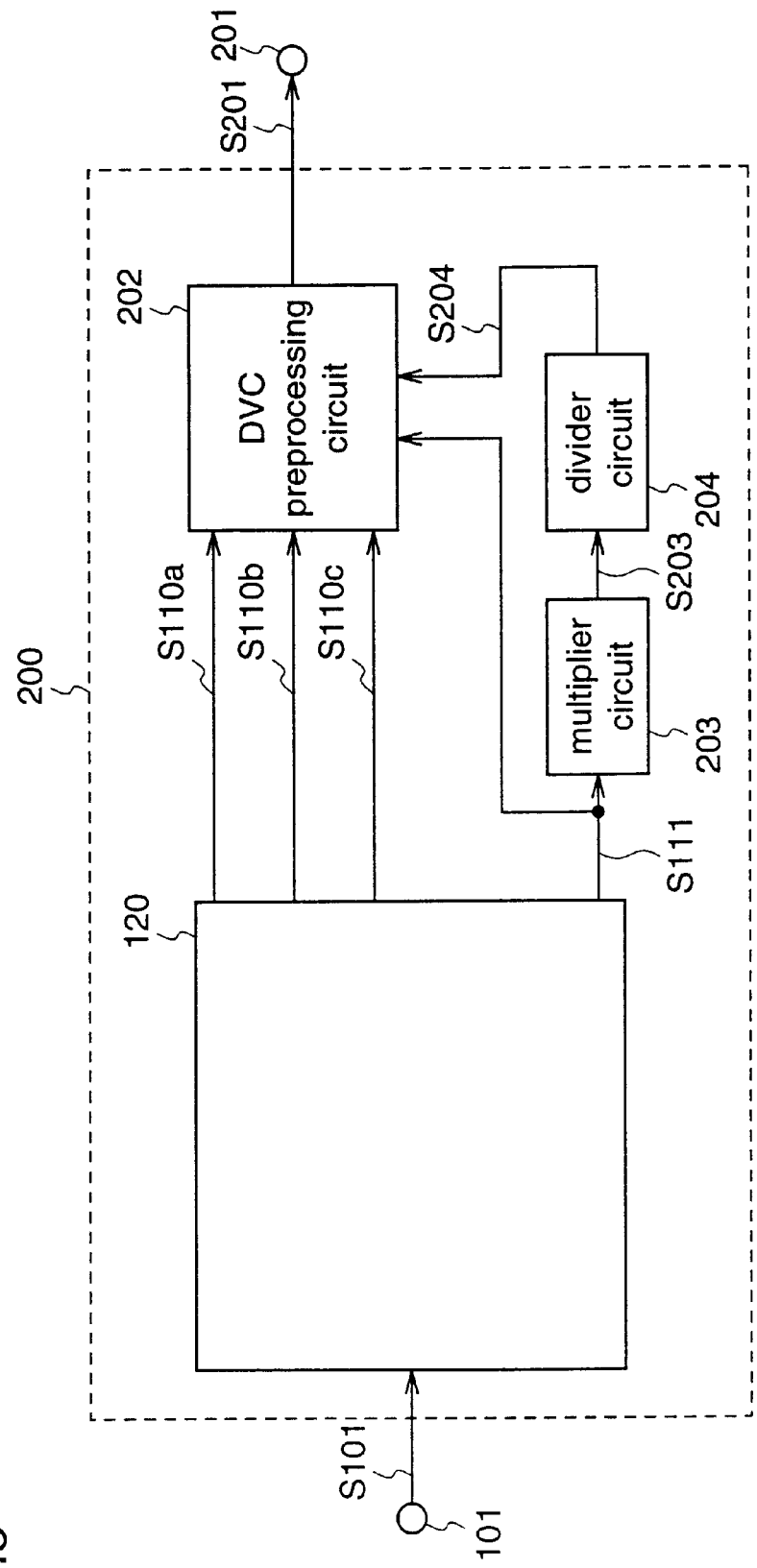
FIG. 5 is a block diagram illustrating a video signal processor according to a second embodiment of the present invention.

FIG. 5 is a block diagram illustrating a video signal processor 200 according to the second embodiment of the present invention.

In the video signal processor 200 as shown in FIG. 5, the same reference numerals as those in FIG. 1 denote the same elements as those of the video signal processor 100. Further, a block 120 in the video signal processor 200 has the same elements as those of the block 120 in the video signal processor 100.

The video signal processor 200 is different from the video signal processor 100 in that a DVC preprocessing circuit 202, a multiplier circuit 203 and a divider circuit 204 are newly provided. Hereinafter, the DVC preprocessing circuit 202, the multiplier circuit 203 and the divider circuit 204 will be described.

The multiplier circuit 203 multiplies the 27-MHz clock which is the output of the free-run clock generator circuit 111, for example by two, to output a 54-MHz clock S203. The divider circuit 204 divides the 54-MHz clock S203 which is the output of the multiplier circuit 203, for example by three, to generate a 18-MHz clock S204.

The DVC preprocessing circuit 202 multiplexes the 13.5-MHz Y signal S110a, Cr signal S110b and Cb signal S110c on the 18-MHz clock S204, to be output as the second digital video signal S201 to the second digital video signal output terminal 201. At this time, the DVC preprocessing circuit 202 decompresses the Y signal S110a into the 18-MHz Y signal, thins down the Cr signal S110b and the Cb signal S110c into 9 MHz, and multiplexes these signals.

The second digital video signal S201 is input from the second digital video signal output terminal 201 to a DCT (Discrete Cosine Transform) block for performing intra-frame compression/decompression, processed at 18 MHz, and thereafter recorded/reproduced by a block for performing recording/reproduction into/from a tape.

As described above, according to the video signal processor according to the second embodiment, the multiplier circuit 203 for multiplying the 27-MHz clock by two, which clock is generated by the free-run clock generator circuit 111, and the divider circuit 112 for dividing the 54-MHz clock by three, which clock is generated by the multiplier circuit 203 are provided. Therefore, without providing outside the analog PLL circuit which is synchronized with one frame, the 13.5-MHz digital Y signal, digital Cr signal and digital Cb signal can be converted into 18-MHz digital Y signal, digital Cr signal and digital Cb signal.

[Embodiment 3]

Figure 6:
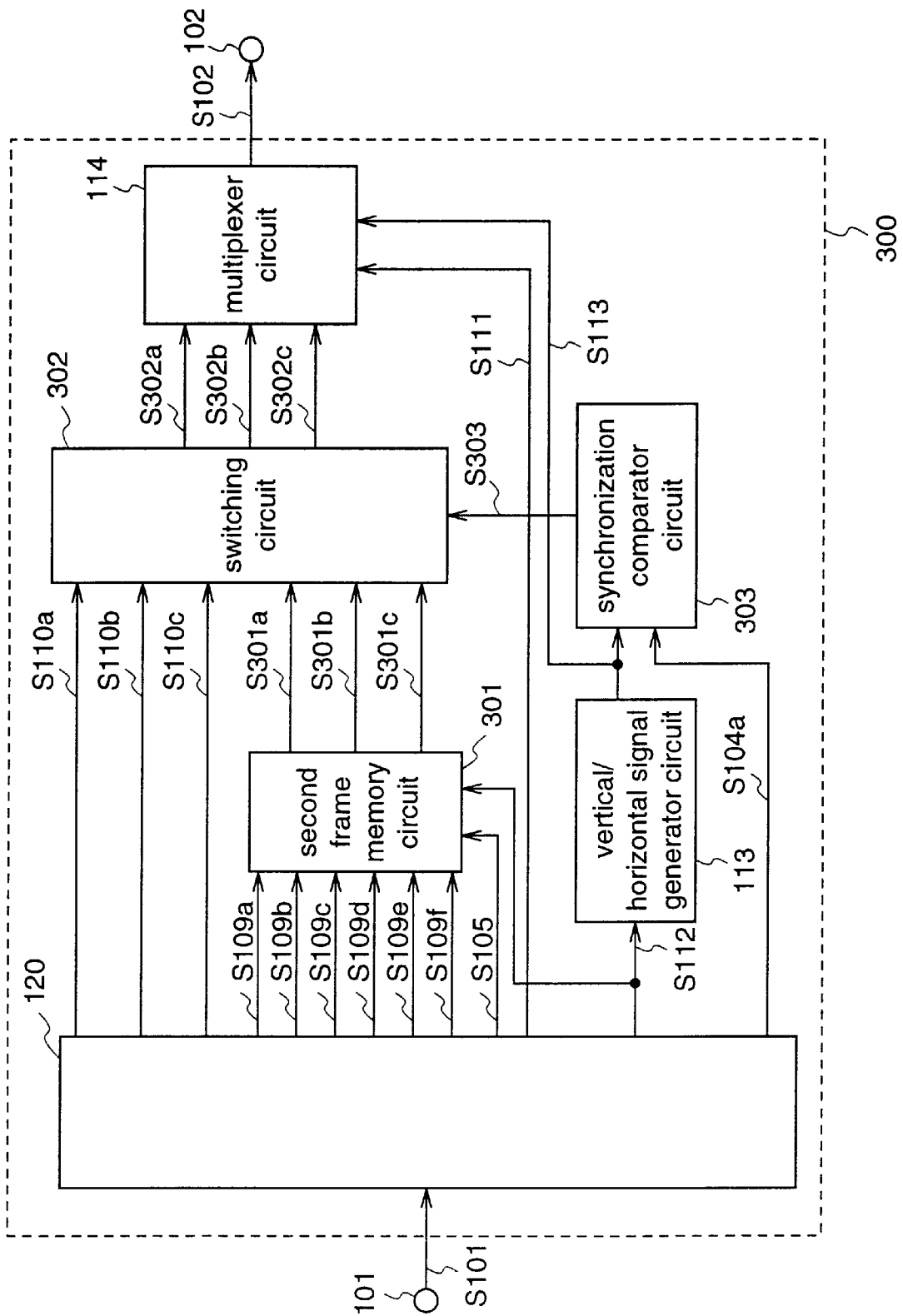
FIG. 6 is a block diagram illustrating a video signal processor according to a third embodiment of the present invention.

FIG. 6 is a block diagram illustrating a video signal processor 300 according to the third embodiment of the present invention.

In the video signal processor 300 shown in FIG. 6, the same reference numerals as those in FIG. 1 denote the same elements as those of the video signal processor 100. Further, a block 120 in the video signal processor 300 has the same elements as those of the block 120 in the video signal processor 100.

The video signal processor 300 is different from the video signal processor 100 in that a second frame memory circuit 301, a switching circuit 302 and a synchronization comparator circuit 303 are provided.

The second frame memory 301 writes the DD converted Y signal S109a, the DD converted Cr signal S109b and the DD converted Cb signal S109c which are output from the DD converter circuit 109 on the 14.3-MHz burst locked clock S105, and thereafter reads out the signals on the 13.5-MHz free-run clock S112, to be output as a Y signal S301a, a Cr signal S301b and a Cb signal S301c.

The switching circuit 302 alternately switches between the Y signal S110a, the Cr signal S110b and the Cb signal S110c which are output from the first frame memory circuit 110, and the Y signal S301a, the Cr signal S301b and the Cb signal S301c which are output from the second frame memory circuit 301, and outputs the signals to the multiplexer circuit 114 for each frame.

The synchronization comparator circuit 303 compares the phase of the synchronous signal S104a which is output from the synchronization separator/burst detector circuit 104 with the phase of the synchronous signal S113 which is output from the vertical/horizontal signal generator circuit 113, and outputs a switch signal for instructing the switching circuit 302 to output the same frame twice in succession when it detected that the phase of the synchronous signal S104a has gotten ahead of the phase of the synchronous signal S113.

Hereinafter, the operations of the first frame memory circuit 110, the second frame memory circuit 301, the switching circuit 302 and the synchronization comparison circuit 303 when the phase of the synchronous signal S104a has gotten ahead of the phase of the synchronous signal S113 are described with reference to FIGS. 7(a)–7(g).

Figure 7:
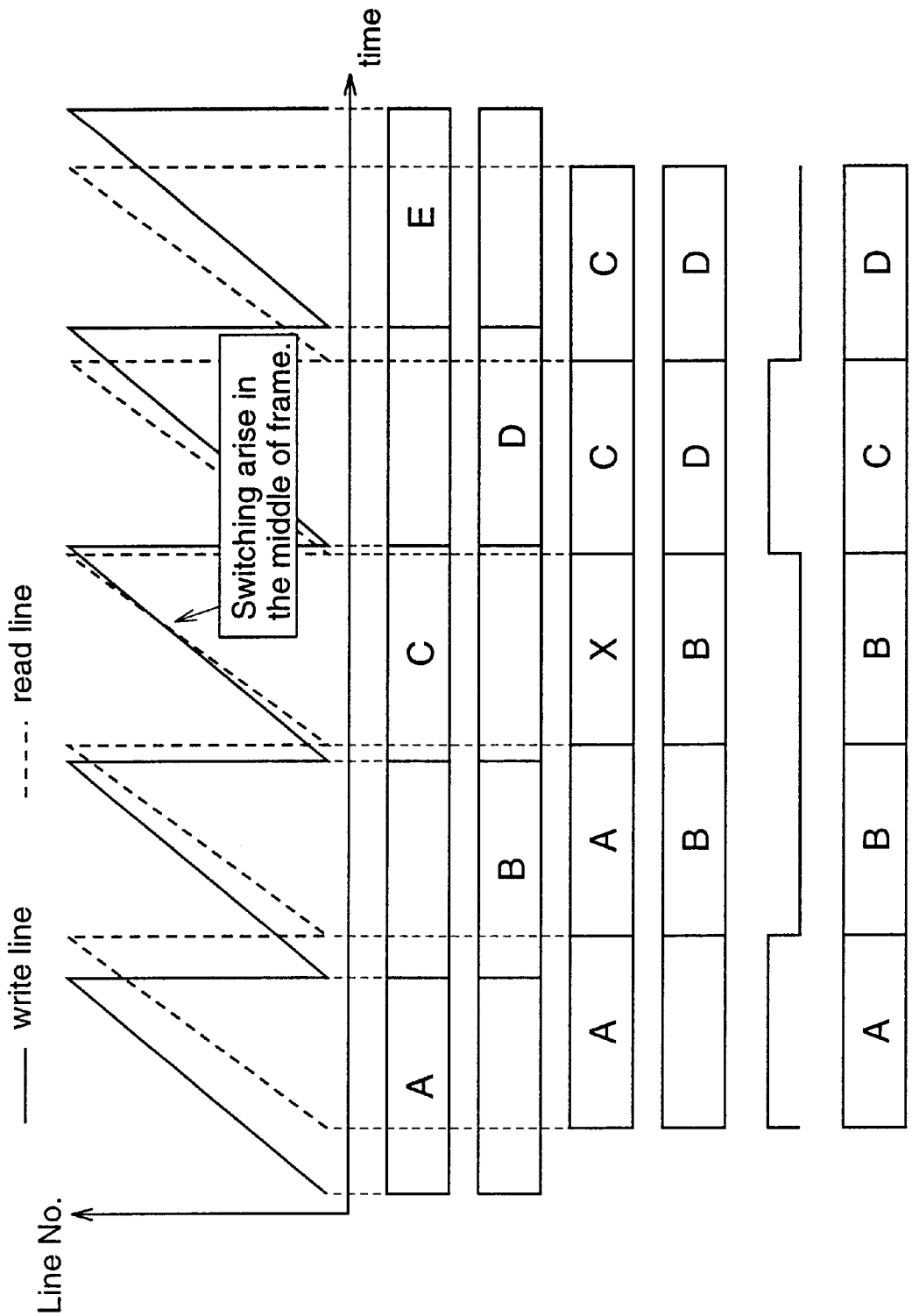
FIGS. 7(a)–7(g) are diagrams for explaining the operation of the video signal processor according to the third embodiment.

FIG. 7(a) is a conceptual diagram showing write/read lines into/from the frame memory circuit. In FIG. 7(a), the write line corresponds to the synchronous signal 104a, and the read line corresponds to the synchronous signal 113. The writing of each signal into the frame memory circuit 110 is performed every other frame, i.e., frame A, frame C, frame E, . . . , as shown in FIG. 7(b). Similarly, the writing of each signal into the second frame memory circuit 301 is also performed every other frame, i.e., frame B, frame D, . . . , as shown in FIG. 7(c). The different frames are alternately written in the first frame memory circuit 110 and the second frame memory circuit 301. The reading of each signal from the first frame memory circuit 110 is performed for each frame, i.e., frame A, frame A, frame X, frame C, frame C, . . . , as shown in FIG. 7(d). Frame X is a frame which is read from the first frame memory circuit 110 when the write line has gotten ahead of the read line as shown in the conceptual diagram of FIG. 7(a) showing the writing/reading, and the read-out frame is switched at this time. To be more specific, in this case, initially frame A is read, and frame C is read from halfway of the frame. The reading of each frame from the second frame memory circuit 301 is performed for each frame, i.e., frame B, frame B, frame D, frame D, . . . , as shown in FIG. 7(e). The synchronization comparator circuit 303 normally outputs the switch signal S303 for alternately selecting the output of the first frame memory circuit 110 and the output of the second frame memory circuit 301. However, when it is detected that the write line has gotten ahead of the read line, the synchronization comparator circuit 303 outputs the switch signal S303 for instructing the switching circuit 302 to output frame B twice in succession as shown in FIG. 7(f), and the the switching circuit 302 outputs the Y signal 302a, the Cr signal 302b and the Cb signal 302c as shown in FIG. 7(g), in accordance with the switch signal S303.

As described above, the switching circuit 302 outputs the same frame twice when the write line has gotten ahead of the read line, whereby the switching between the read-out frames does not arise in the middle of reading of the frame.

On the other hand, when the synchronization comparator circuit 303 detects that the phase of the synchronous signal S113 has gotten ahead of the phase of the synchronous signal S104a, it outputs a switch signal for instructing elimination of one frame of images.

Hereinafter, the operations of the first frame memory circuit 110, the second frame memory circuit 301, the switching circuit 302 and the synchronization comparator circuit 303 when the phase of the synchronous signal S113 has gotten ahead of the phase of the synchronous signal S104a are described with reference to FIGS. 8(a)–8(g).

Figure 8:
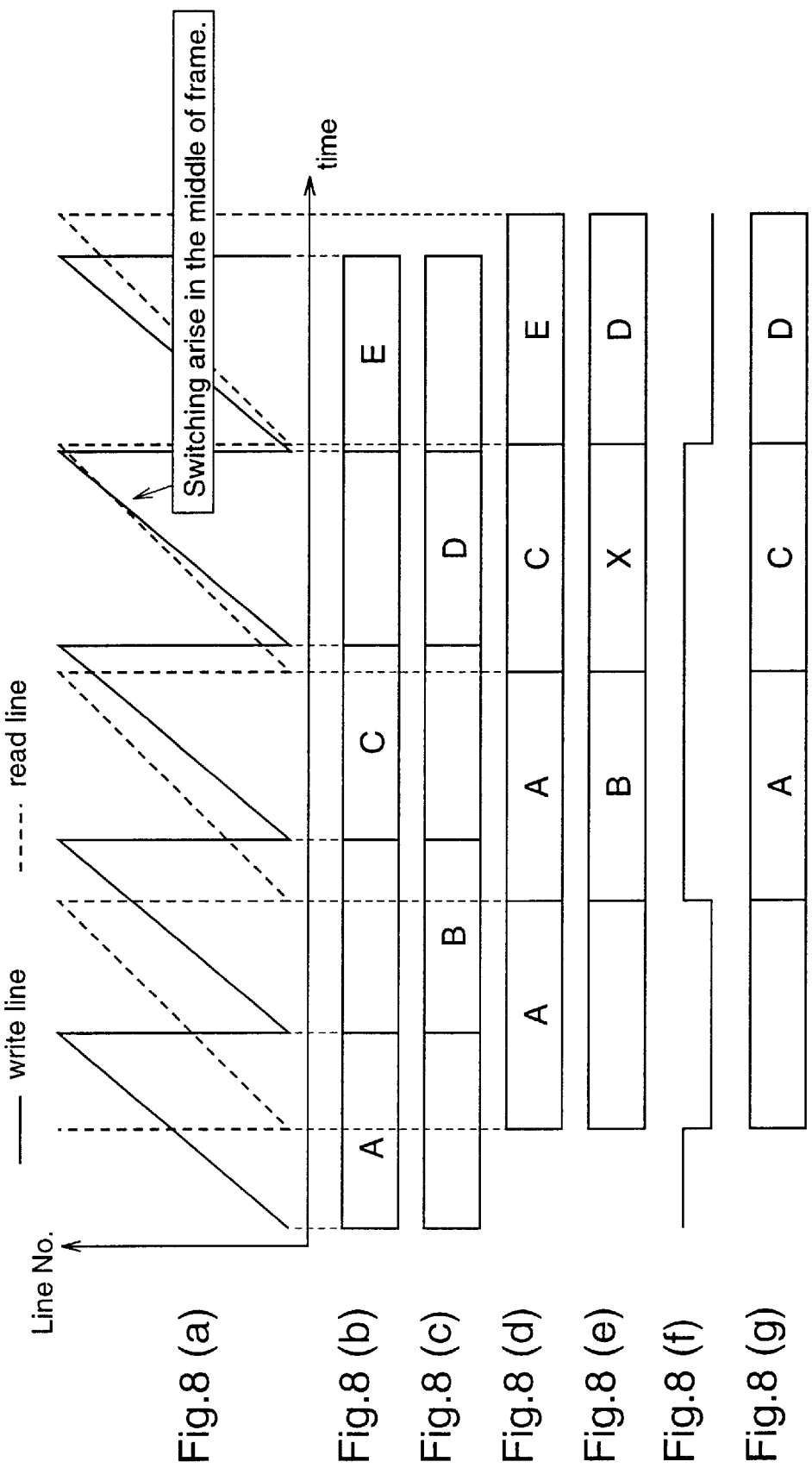
FIGS. 8(a)–8(g) are diagrams for explaining the operation of the video signal processor according to the third embodiment of the present invention.

FIG. 8(a) is a conceptual diagram showing write/read lines into/from the frame memory circuit. In FIG. 8(a), the write line corresponds to the synchronous signal 104a, and the read line corresponds to the synchronous signal 113. The writing into the first frame memory circuit 110 is performed every other frame, i.e., frame A, frame C, frame E, . . . , as shown in FIG. 8(b). Similarly, the writing into the second frame memory circuit 301 is also performed every other frame, i.e., frame B, frame D, . . ., as shown in FIG. 8(c). The different frames are alternately written in the first frame memory circuit 110 and the second frame memory circuit 301. The reading from the first frame memory circuit 110 is performed for each frame, i.e., frame A, frame A, frame C, frame E, . . . , as shown in FIG. 8(d). The reading from the second frame memory circuit 301 is performed for each frame, i.e., frame B, frame X, frame D, . . . , as shown in FIG. 8(e). Frame X is a frame which is read from the second frame memory circuit 301 when the read line has gotten ahead of the write line as shown in the conceptual diagram of FIG. 8(a) showing the writing/reading, and switching between the read-out frames arise at this time. To be more specific, initially frame B is read from the second frame memory circuit 301, and then frame D is read in the middle of the reading of the frame. Normally, the synchronization comparator circuit 303 outputs a switch signal for alternately selecting the output of the first frame memory circuit 110 and the output of the second frame memory circuit 301. However, when it detects that the read line has gotten ahead of the write line, the circuit 303 outputs the switch signal S303 for instructing the switching circuit 302 not to output frame B as shown in figure (f). The switching circuit 302 outputs the Y signal 302a, the Cr signal 302b and the Cb signal 302c as shown in FIG. 8(g), in accordance with the switch signal S303.

As described above, according to the video signal processor according to the third embodiment, the synchronization comparator circuit 303 outputs the switch signal S303 to the switching circuit 302 for instructing the switching circuit 302 to output the same frame twice when it detects that the write line has gotten ahead of the read line, and outputs the switch signal S303 instructing the switching circuit 302 to eliminate one frame of images when it detects that the read line has gotten ahead of the write line. Therefore, the switching between the read-out frames does not arise during the reading of frames, whereby the occurrence of noises on the screen can be prevented even when non-television signals are input.

What is claimed is:

1. A video signal processor comprising:
    an A/D converter circuit operable to sample an analog video signal on a first clock signal having a first frequency, to be converted into a first digital video signal;
    a synchronous signal separator operable to separate a first synchronous signal from the first digital video signal;
    a first clock generator operable to generate the first clock signal from the first synchronous signal;
    a sampling frequency converter operable to interpolate the first digital video signal to be converted into a second digital video signal, and to output the second digital video signal based on a second clock signal having a second frequency;
    a multiplier operable to multiply the second clock signal to generate a third clock signal having a third frequency;
    a divider operable to divide the third clock signal to generate a fourth clock signal having a fourth frequency; and
    a second digital-digital converter operable to convert the third digital video signal into a fourth digital video signal based on the fourth clock signal,
    wherein said sampling frequency converter comprises:
        a first digital-digital converter operable to interpolate the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and to convert the first digital video signal into the second digital video signal to be output based on the first clock signal;
        a second clock generator operable to generate a second clock signal having a second frequency which is one-Nth as high as that of the first clock signal; and
        a storage capable of retaining the second digital video signal as well as reading the retained second digital video signal on the second clock signal to be output as a third digital video signal.

2. A video signal processor comprising:
    an A/D converter circuit operable to sample an analog video signal on a first clock signal having a first frequency, to be converted into a first digital video signal;
    a synchronous signal separator operable to separate a first synchronous signal from the first digital video signal;
    a first clock generator operable to generate the first clock signal from the first synchronous signal;
    a sampling frequency converter operable to interpolate the first digital video signal to be converted into a second digital video signal, and to output the second digital video signal based on a second clock signal having a second frequency; and
    a synchronization comparator operable to compare a phase of the first synchronous signal with a phase of a second synchronous signal which is generated from the second clock signal,
    wherein said sampling frequency converter comprises:
        a first digital-digital converter operable to interpolate the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and to convert the first digital video signal into the second digital video signal to be output based on the first clock signal;
        a second clock generator operable to generate a second clock signal having a second frequency which is one-Nth as high as that of the first clock signal; and
        a storage capable of retaining the second digital video signal as well as reading the retained second digital video signal on the second clock signal to be output as a third digital video signal;
    wherein said storage comprises:
        a first frame storage capable of retaining the second digital video signal in frame units as well as reading the retained second digital video signal in frame units based on the second clock signal to be output as a fourth digital video signal;
        a second frame storage capable of retaining the second digital video signal in frame units as well as reading the retained second digital video signal in frame units based on the second clock signal to be output as a fifth digital video signal; and
        a switch operable to receive the fourth digital video signal and the fifth digital video signal, and alternately switch between the fourth digital video signal and the fifth digital video signal to be output as the third digital video signal,
    wherein said synchronous comparator is further operable to output a switch signal which instructs said switch to output either the fourth digital video signal or fifth digital video signal as the third digital video signal repeatedly twice when it detects that the phase of the first synchronous signal has gotten ahead of the phase of the second synchronous signal, and to output a switch signal which instructs said switch to eliminate one frame of either the fourth digital video signal or fifth digital video signal when it detects that the phase of the second synchronous signal has gotten ahead of the phase of the first synchronous signal, to said switch, and wherein said switch is further operable to output one of the fourth digital video signal and the fifth digital video signal as the third digital video signal, in accordance with the switch signal.

3. A video signal processing method comprising:

sampling an analog video signal on a first clock signal having a first frequency to be converted into a first digital video signal;

separating a first synchronous signal from the first digital video signal;

generating the first clock signal from the first synchronous signal;

interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output based on the first clock signal;

generating a second clock signal having a second frequency which is one-Nth as high as that of the first clock signal;

retaining the second digital video signal as well as reading the retained second digital video signal on the second clock signal to be output as a third digital video signal;

multiplying the second clock signal to generate a third clock signal having a third frequency;

dividing the third clock signal to generate a fourth clock signal having a fourth frequency; and converting the third digital video signal into a fourth digital video signal on the basis of the fourth clock signal.

4. A video signal processing method comprising:

sampling an analog video signal on a first clock signal having a first frequency to be converted into a first digital video signal;

separating a first synchronous signal from the first digital video signal;

generating the first clock signal from the first synchronous signal;

interpolating the first digital video signal to calculate a second digital video signal, a length of one horizontal period and a sampling frequency of which signal are the same as those of the first digital video signal and an effective pixel period in one horizontal period of which signal is N times (N>0) as long as that of the first digital video signal, and converting the first digital video signal into the second digital video signal to be output based on the first clock signal;

generating a second clock signal having a second frequency which is one-Nth as high as that of the first clock signal;

retaining the second digital video signal as well as reading the retained second digital video signal on the second clock signal to be output as a third digital video signal; and comparing a phase of the first synchronous signal with a phase of a second synchronous signal which is generated from the second clock signal, wherein said retaining as well as reading comprises:

retaining the second digital video signal in frame units as well as reading the retained second digital video signal based on the second clock signal in frame units to be output as a fourth digital video signal;

retaining the second digital video signal in frame units as well as reading the retained second digital video signal based on the second clock signal in frame units to be output as a fifth digital video signal; and receiving the fourth digital video signal and the fifth digital video signal, and alternately switching between the fourth digital video signal and the fifth digital video signal to be output as the third digital video signal, wherein said comparing comprises outputting a switch signal which instructs to output either the fourth digital video signal or the fifth digital video signal as the third digital video signal repeatedly twice when it is detected that the phase of the first synchronous signal has gotten ahead of the phase of the second synchronous signal, and outputting a switch signal which instructs to eliminate one frame of either the fourth digital video signal or fifth digital video signal when it is detected that the phase of the second synchronous signal has gotten ahead of the phase of the first synchronous signal, and wherein said receiving and alternately switching between the fourth digital video signal and the fifth digital video signal comprises outputting one of the fourth digital video signal and the fifth digital video signal as the third digital video signal, in accordance with the switch signal.

* * * * *